(12) United States Patent
Hartel et al.

(10) Patent No.: US 6,816,855 B2
(45) Date of Patent: Nov. 9, 2004

(54) BUILDING SOFTWARE STATEMENTS SUCH AS SEARCH QUERIES TO A TABULAR DATABASE THROUGH A USER-INTERACTIVE COMPUTER DISPLAY INTERFACE

(75) Inventors: John Mark Hartel, Austin, TX (US); Rob P. Lowe, Austin, TX (US); Gary Louis Macomber, Hutto, TX (US); Richard Walton Ragan, Jr., Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 392 days.

(21) Appl. No.: 09/820,500

(22) Filed: Mar. 29, 2001

(65) Prior Publication Data

US 2002/0143749 A1 Oct. 3, 2002

(51) Int. Cl.[7] .............................. G06F 17/30; G06F 9/44
(52) U.S. Cl. .......................................... 707/4; 717/100
(58) Field of Search .............................. 706/45, 47, 60; 707/103 R, 104.1, 4; 711/100, 161; 345/473, 474, 733, 762; 715/513; 717/100

(56) References Cited

U.S. PATENT DOCUMENTS 5,611,066 A * 3/1997 Keele et al. ................. 711/100
5,701,400 A * 12/1997 Amado ........................ 706/45
5,909,678 A * 6/1999 Bergman et al. ............... 707/4

* cited by examiner

Primary Examiner—Uyen Le
Assistant Examiner—Te Y Chen
(74) Attorney, Agent, or Firm—Jerry B. Kraft; Jeffrey S. LaBaw

(57) ABSTRACT

A user-interactive display interface implementation for building structured software program statements and, particularly, such structured statements which may serve as search queries to databases including a plurality of display rows together with means enabling the entry of program terms into each of said rows. A template is vertically movable to each of said rows and includes a template row of indicators, each defining a type of program term enabled to be positioned in said row coincident with said indicator. There are a plurality of user-activatable menus of selectable terms, each menu respectively associated with one of said indicators. The selectable terms in each of the menus are respectively of the term type enabled to be positioned coincident with the associated indicator. Then, for editing purposes, there is selection of one of said indicators to thereby display the menu associated with the selected indicator.

33 Claims, 7 Drawing Sheets

BUILDING SOFTWARE STATEMENTS SUCH AS SEARCH QUERIES TO A TABULAR DATABASE THROUGH A USER-INTERACTIVE COMPUTER DISPLAY INTERFACE

TECHNICAL FIELD

The present invention relates to user-interactive computer supported display technology and, particularly, to such user-interactive systems and methods which provide interactive users with user friendly interfaces for building software program statements such as search queries for database management and access.

BACKGROUND OF RELATED ART

The past decade has been marked by a technological revolution driven by the convergence of the data processing industry with the consumer electronics industry. This advance has been even further accelerated by the extensive consumer and business involvement in the Internet over the past few years. As a result of these changes it seems as if virtually all aspects of human endeavor in the industrialized world requires human/computer interfaces. There is a need to make computer directed activities accessible to people who, up until a few years ago, were computer illiterate or, at best, computer indifferent.

Thus, there is continuing demand for display interfaces to computers and networks which improve the ease of use for the interactive user to access functions and data from the computer. With desktop-like interfaces including windows and icons, as well as three-dimensional virtual reality simulating interfaces, the computer industry has been working hard to fulfill such interface needs. However, in the area of database management, interfaces to the databases appear to be formidable obstacles to a great many users who would have considerable needs for data access. Of course, database access and management historically is one of the original primary computer functions, and, as such, it is full of language and functions developed and communicated between computer professionals. As a result, database management and access may be somewhat esoteric and foreboding to the new computer users in businesses and personal computer situations in which they most benefit from the development of and access to databases. Terms such as relational databases (RDBMS) structured query language (SQL) searches have put off such users. Less sophisticated users find it very difficult to frame SQL search queries out of the relatively complex language. As a result, except for some limited access to databases through spreadsheets, the bulk of new computer users have shown a reluctance to venture into database organization and database searching. Accordingly, the computer industries are trying to address the need to make interfaces for database organization less foreboding and more user friendly.

SUMMARY OF THE PRESENT INVENTION

The present invention provides a user-interactive display interface implementation for building structured software program statements and, particularly, such structured statements that may serve as search queries to databases. This display interface implementation comprises a plurality of display rows together with means enabling the entry of program terms into each of said rows. A template is provided that is vertically movable to each of said rows and includes a template row of indicators, each defining a type of program term enabled to be positioned in said row coincident with said indicator. There are a plurality of user-activatable menus of selectable terms, each menu respectively associated with one of said indicators. The selectable terms in each of the menus are respectively of the term type enabled to be positioned coincident with the associated indicator. Then, for editing purposes, there are user-interactive means for selecting one of said indicators to thereby display the menu associated with the selected indicator. Preferably, the selected menu is a scrolled menu from the selected indicator. The program or search query statements being built are sequential and preferably wrap from at least one of said rows to the next row.

When this display interface implementation is used to build search queries, then the rows in the array are enabled for the entry of search terms. In this search query building, the search term types may be the classes of properties, operators and values for the selected properties.

BRIEF DESCRIPTION OF THE DRAWINGS

The present invention will be better understood and its numerous objects and advantages will become more apparent to those skilled in the art by reference to the following drawings, in conjunction with the accompanying specification, in which.

DETAILED DESCRIPTION OF THE PREFERRED EMBODIMENTS

Figure 1:
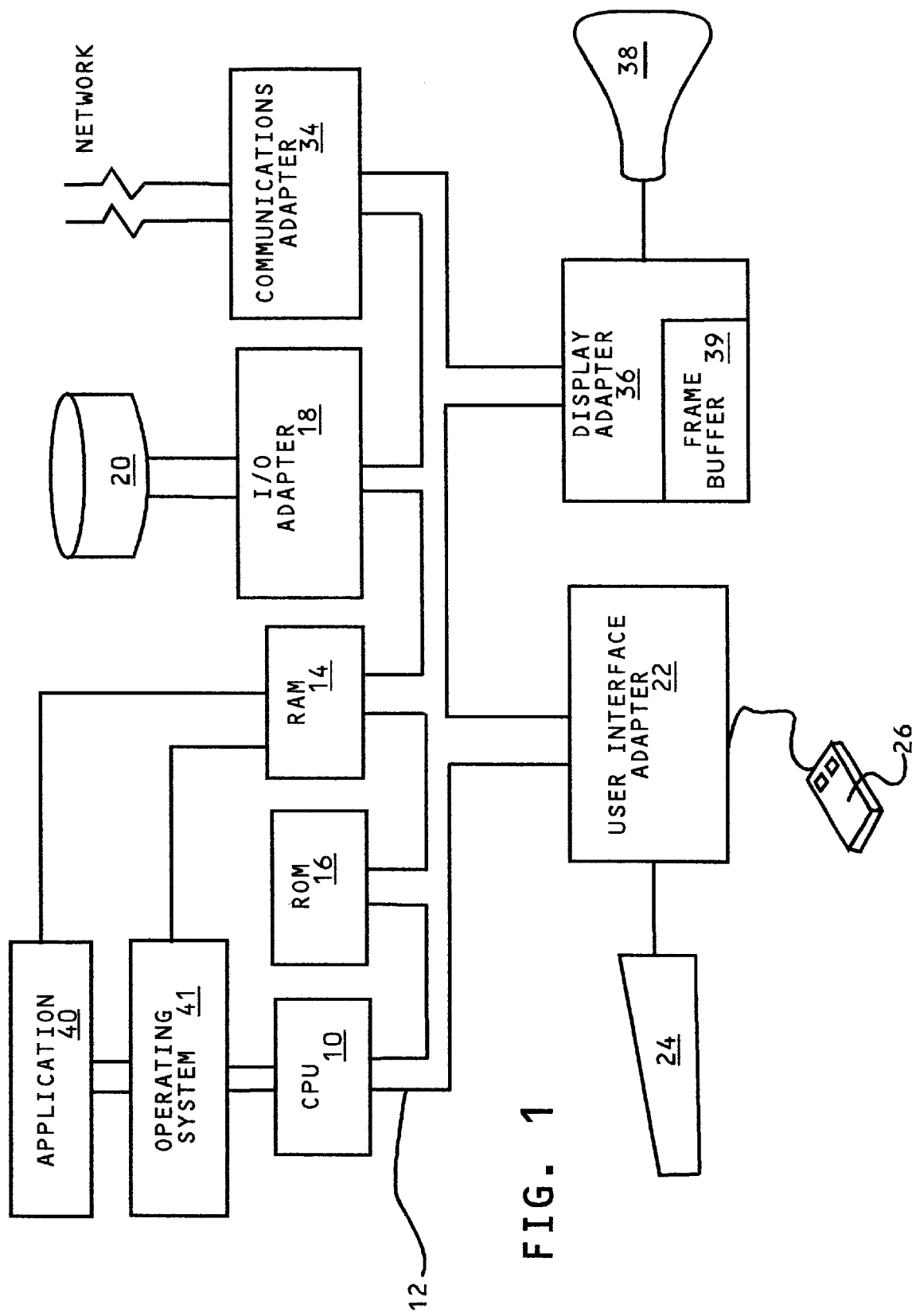
FIG. 1 is a block diagram of a generalized data processing system including a central processing unit in which the database search query building implementation of the present invention may be implemented.

Referring to FIG. 1, a typical data processing system is shown which may function as a basic computer controlled system used in implementing the present invention of building, rearranging, editing or modifying display interfaces of search queries arranged in arrays. A central processing unit (CPU) 10, such as one of the PC microprocessors or microprocessors in workstations, e.g. the e-Server pSeries(™) available from International Business Machines Corporation (IBM), is provided and interconnected to various other components by system bus 12. An operating system 41 runs on CPU 10, provides control and is used to coordinate the function of the various components of FIG. 1. Operating system 41 may be one of the commercially available operating systems such as AIX 6000(™) or OS/2 (™); Microsoft's WindowsNT(™) or Windows98(™), as well as other UNIX and AIX operating systems. Application programs 40, including the search query building program of this invention, are controlled by the system and are moved into and out of the main memory Random Access Memory (RAM) 14 and consequently into and out of secondary storage, disk drive 20, as needed. The database modification or editing system of this invention, which will subsequently be described in greater detail, is implemented as an application program 40. A Read Only Memory (ROM) 16 is connected to CPU 10 via bus 12 and includes the Basic Input/Output System (BIOS) that controls the basic computer functions. RAM 14, I/O adapter 18 and communications adapter 34 are also interconnected to system bus 12. I/O adapter 18 may be a Small Computer System Interface (SCSI) adapter that communicates with the disk storage device 20. Communications adapter 34 interconnects bus 12 with an outside network enabling the data processing system to communicate with other such systems over a Local Area Network (LAN) or Wide Area Network (WAN), such as the Internet. It should be noted that the database search query building and modification system of the present invention may be used with respect to databases that are accessed over a network. I/O devices are also connected to system bus 12 via user interface adapter 22 and display adapter 36. Keyboard 24 and mouse 26 are all interconnected to bus 12 through user interface adapter 22. It is through such input devices that the user may interactively modify and rearrange the database search queries according to the present invention in the manner to be subsequently described. Display adapter 36 includes a frame buffer 39, which is a storage device that holds a representation of each pixel on the display screen 38. Images may be stored in frame buffer 39 for display on monitor 38 through various components, such as a digital to analog converter (not shown) and the like. By using the aforementioned I/O devices, a user is capable of inputting information to the system through the keyboard 24 or mouse 26 and receiving output information from the system via display 38 for purposes of search query building and editing.

There will now be described a simple illustration of the present invention with respect to the display screens of FIGS. 2 through 6. When the screen images are described, it will be understood that these may be rendered by storing image and text creation programs, such as those in any conventional window operating system in the RAM 14 of the system of FIG. 1. The operating system is diagrammatically shown in FIG. 1 as operating system 41. An embodiment of the present invention will be described commencing with the display screen shown in FIG. 2. This initial display screen is presented to the viewer on display monitor 38 of FIG. 1. In accordance with conventional techniques, the user may control the screen interactively through a conventional I/O device, such as mouse 26 of FIG. 1, which operates through user interface 22 to call upon programs in RAM 14 cooperating with the operating system 41 to create the images in frame buffer 39 of display adapter 36 to control the display on monitor 38.

Figure 2:
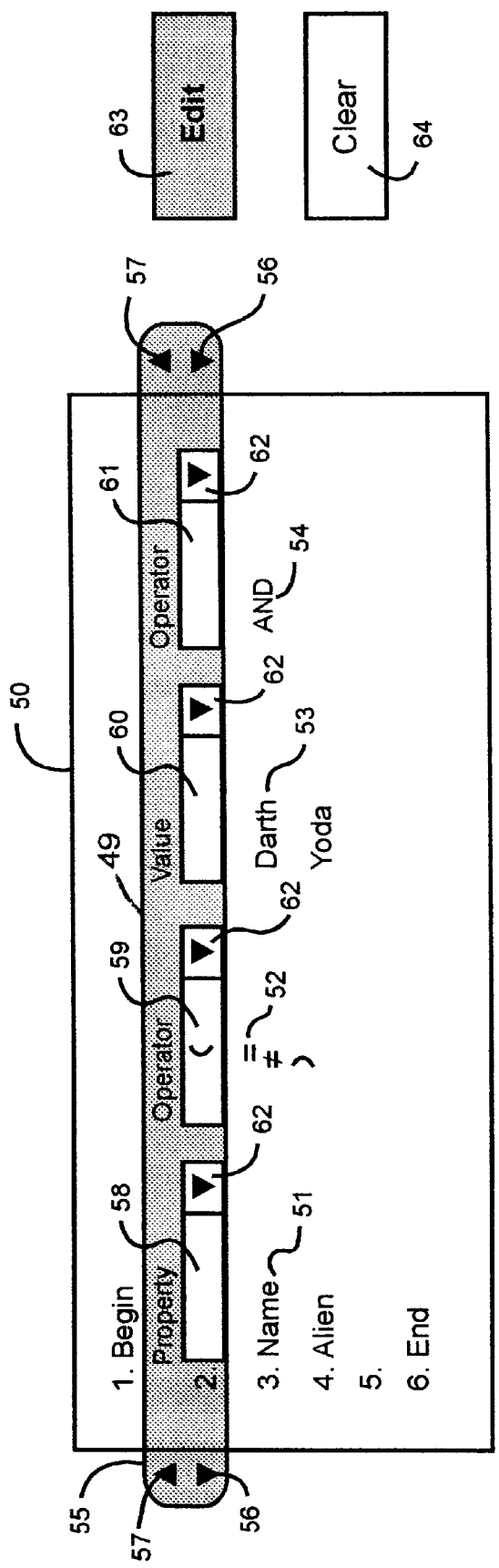
FIG. 2 is a diagrammatic view of an initial interactive display screen on which structured software program statements such as database search queries may be built or edited.

The display interface screen 50 of FIG. 2 shows an array of the structured queries being built or edited in accordance with the present invention. The array has six rows (1–6) of query terms arranged in four columns: 51, 52, 53 and 54, according to term types. There is an Edit button 63 and a Clear button 64. These are used for other editing purposes that are not pertinent to the present invention. In order to build or edit the search query array, template 49 is interactively picked or accessed in FIG. 2, the build/edit mode in effect and template 49 has been picked and is set at row 2. Template 49 is slidable up and down along the row array through the use of scroll buttons 57 and 56. There are four build/edit menu windows 58, 59, 60 and 61 in template 49, each menu window respectively coinciding with one of the columns 51–54 in the search query array so that the column entries in each row may be built or edited. Since the search queries are structured so that the required type of search term varies from column to column, the respective edit menu windows are labeled on template 49 with an indicator defining the search term type to be entered in the respective column in the row being edited, e.g. "Property-Operator-Value Operator". There are menu scroll buttons 62 for each menu window 58–61 for scrolling down the menu of terms which may be selected for the window.

Figure 3:
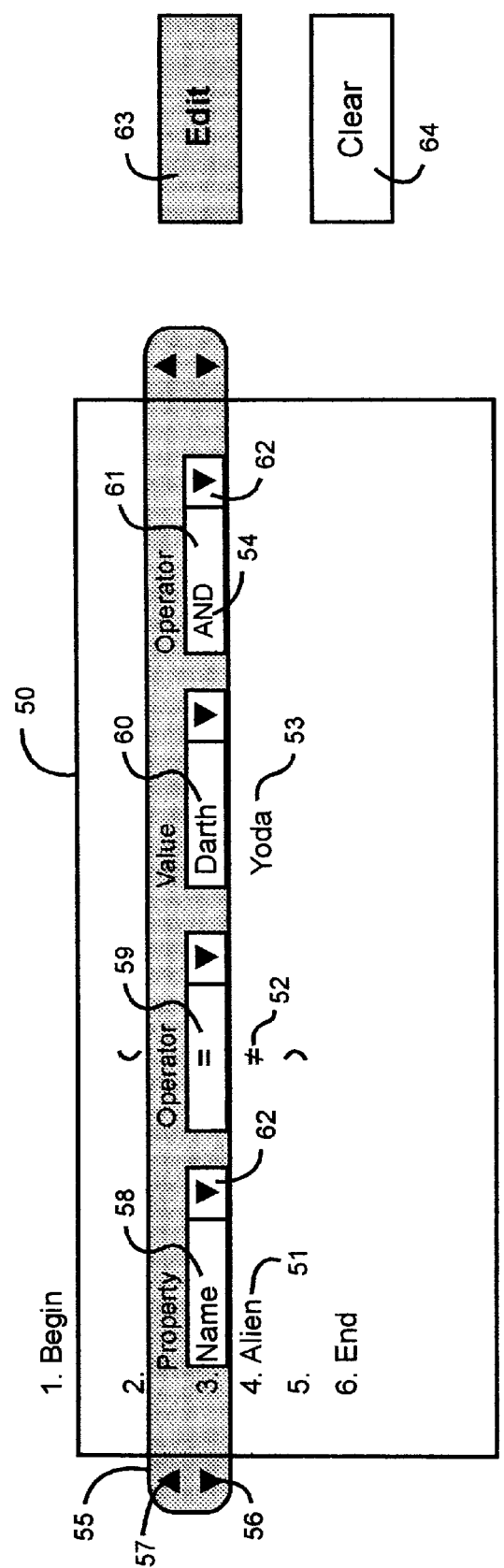
FIG. 3 is a diagrammatic view of the display screen of FIG. 2 after a row in the displayed search query array shown is selected for editing.
Figure 4:
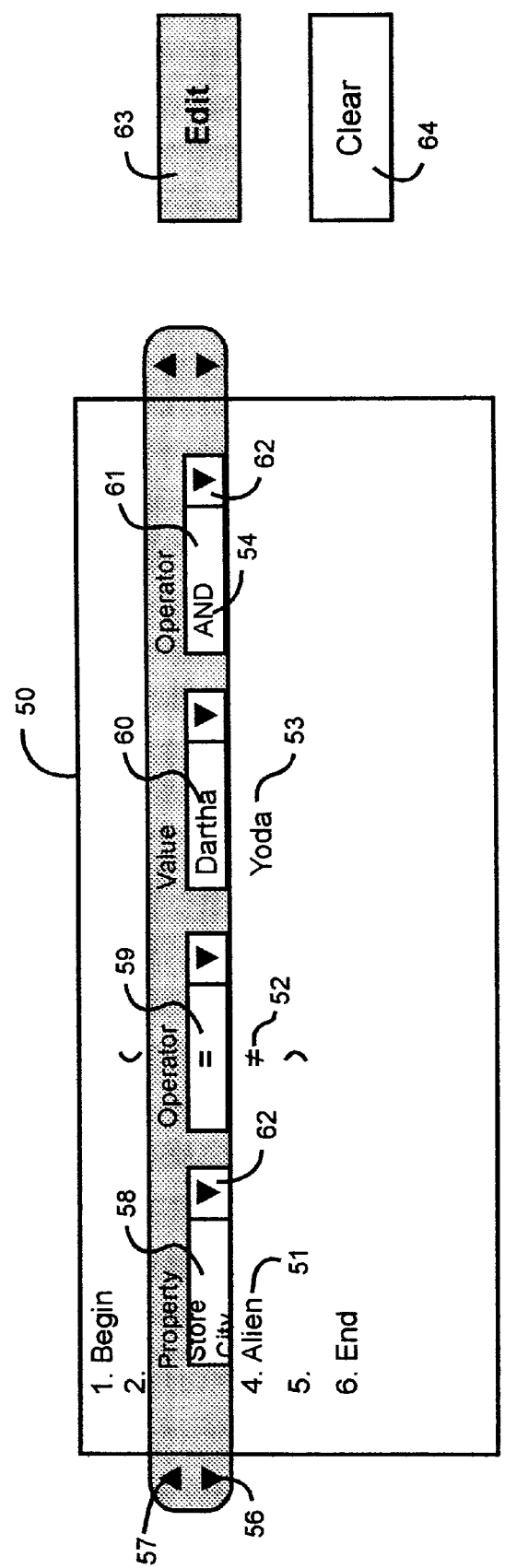
FIG. 4 is a diagrammatic view of the display screen of FIG. 3 after the user has selected a property term type for change, and the property type term menu is being scrolled to a selected property term.
Figure 5:
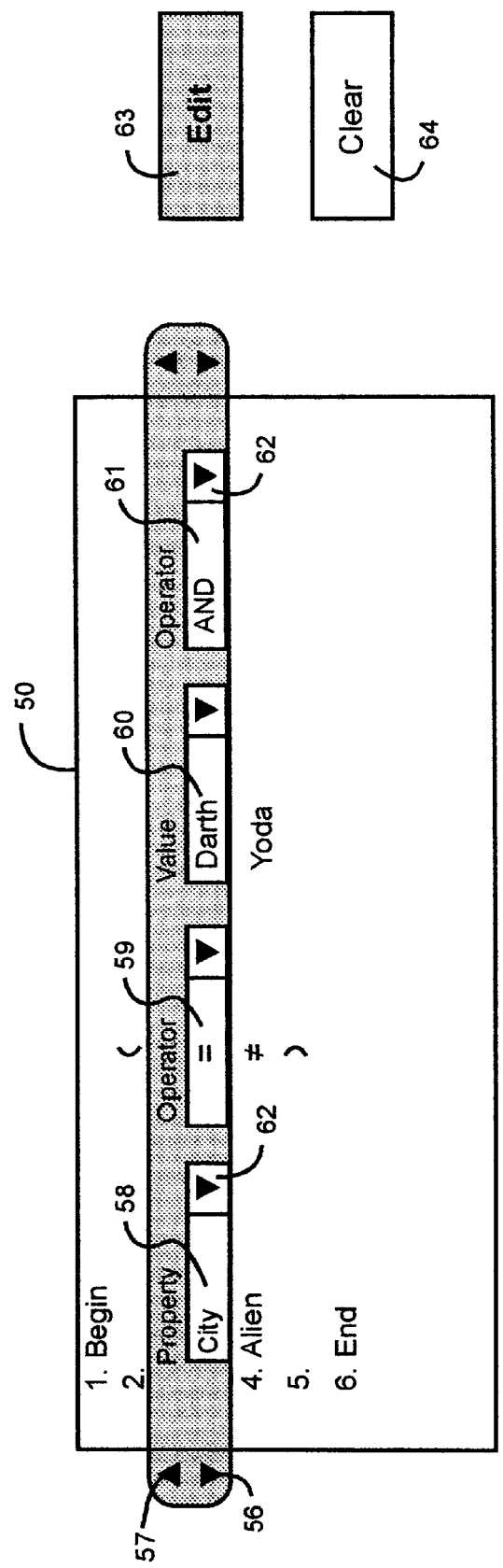
FIG. 5 is a diagrammatic view of the display screen of FIG. 4 after the property type term menu being scrolled has reached and selected the desired menu term, "City"
Figure 6:
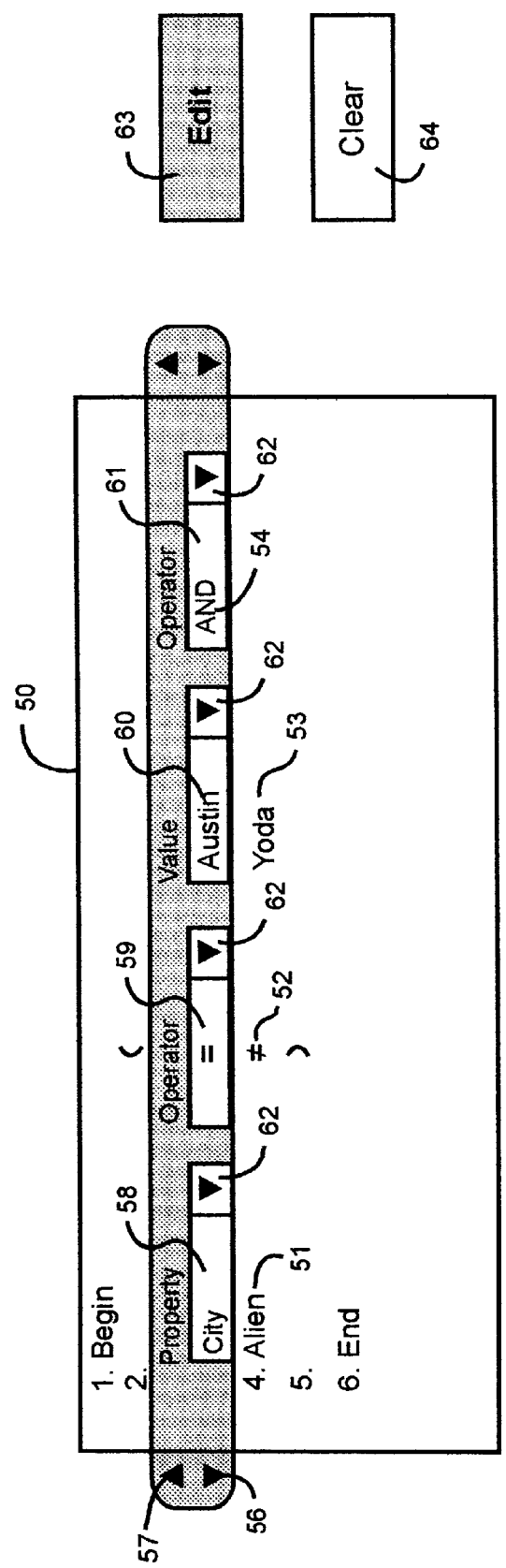
FIG. 6 is a diagrammatic view of the display screen of FIG. 5 after the value type term menu has been scrolled and has reached and selected the desired menu term, "Austin"

Assuming that the user wishes to edit Row 3, template is slid down to Row 3 as shown in FIG. 3. Then, as shown in FIG. 4, the "Property" term, positioned in the first column 51, is changed by scrolling the menu in window 58 through pressing of its scroll button 62 until the selected property term, "City", is reached, FIG. 5, to thereby change the "Property" term from "Name" in FIG. 3 to "City" in FIG. 5. By the same process, as shown in FIG. 6, the "Value" term in the third column 53 has been changed from "Darth" in FIG. 3 to "Austin". Upon the completion of the editing of Row 3, template 49 is slid down to another row which is to be edited. This procedure is continued until the search query is completely built or edited. The start of the query is marked by the term "Begin", which, in the present example, is on Row 1, and the end of the query is marked by the term "End", on Row 6. The query could, if needed, extend for more than six rows, which could be scrolled to on screen 50.

While a four column, six row array has been illustrated, the array used may be any number of columns and rows convenient to the screen. Also, since the sequence in a search query or a program statement being built or edited may often have more terms than the number of terms in a row, the sequence may be wrapped from each row to a succeeding row. The property or value terms used in building search queries may be more general than the specific types of terms in the illustration, e.g. such terms such as "All" or "None" or "Wildcard" types of terms.

Figure 7:
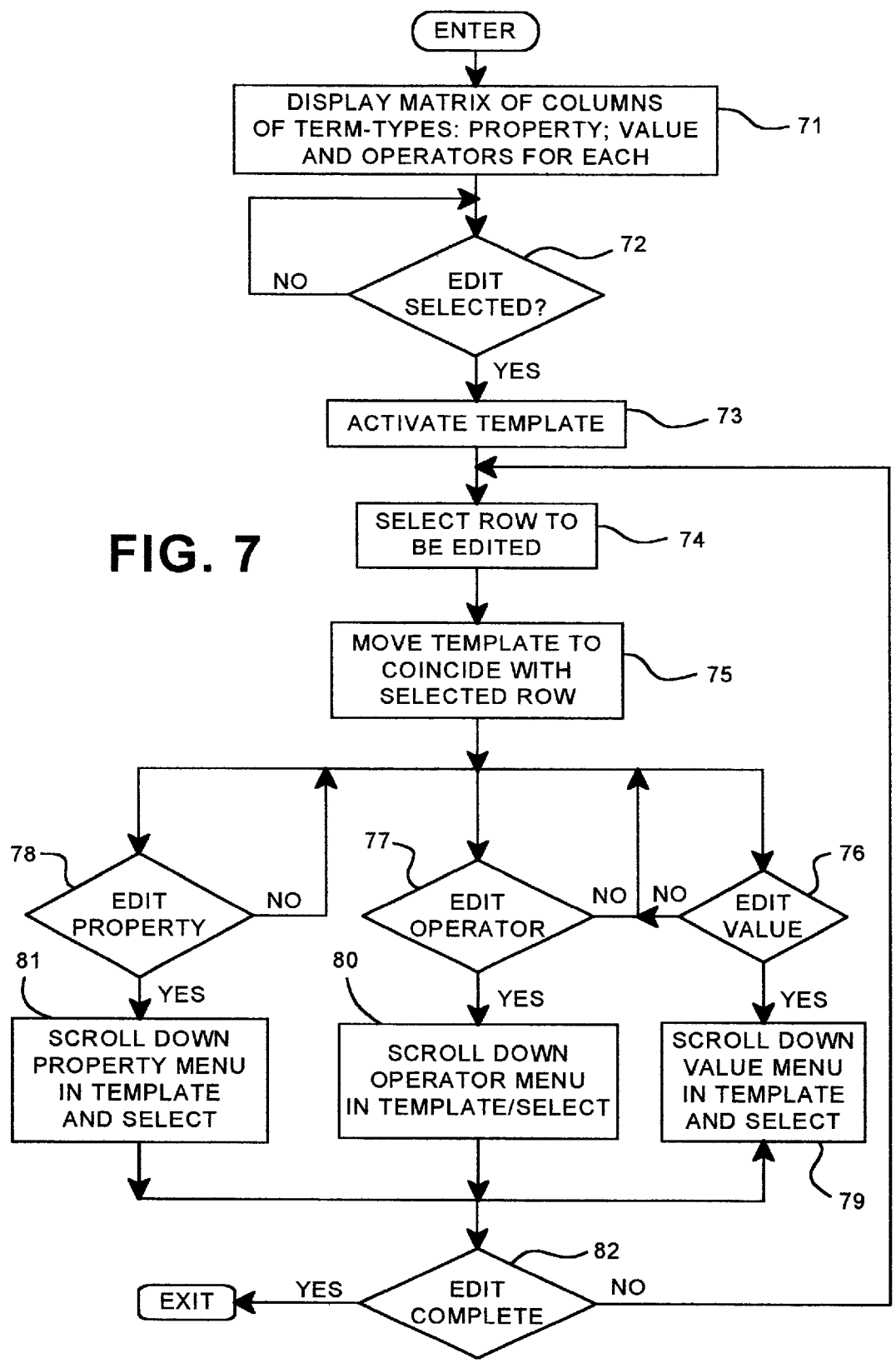
FIG. 7 is a flowchart of the steps involved in building a database search query in accordance with the present invention.

Now, with reference to FIG. 7, we will describe a process implemented by the present invention in conjunction with the flowchart of this figure. To commence a database search query editing, step 71, the array of structured columns and rows of search terms as shown in FIG. 2 is displayed. Then, a determination is made as to whether the user has selected to edit, step 72. If No, the process is returned to step 72 and an edit selection is awaited. If Yes, then, step 73, the vertically slidable build/edit template is interactively picked up. The row to be edited is selected, step 74, and the template is moved to that row 75. When the template coincides with the row to be edited as shown in FIG. 3, decisions are respectively made as to whether to edit the "Value", step 76; which, if Yes, then, step 79, the "Value" menu in the template is scrolled down and a selection made; and/or to edit an "Operator", step 77; which, if Yes, then, step 80, an "Operator" menu in the template is scrolled down and a selection made; and/or to edit the "Property", step 78, which, if Yes, then, step 81, the "Property" menu in the template is scrolled down and a selection is made. Upon the completion of the editing of the row, a determination is made as to whether the editing is complete, step 82. If Yes, the Edit session is exited. If No, then the process is returned to step 74 where another row to be edited is selected. Upon the completion of this edit session, or a build session, when the session is exited, the appropriate database search desired by the user is commenced in any conventional manner using the search query.

While the present invention has been illustrated with an embodiment involving the building and editing of structured search queries to a database, it will be understood that the user-interactive display implementation described may be used for the editing and building of other structured software program statements.

One of the preferred implementations of the present invention is as an application program made up of programming steps or instructions resident in RAM 14, FIG. 1, during computer operations. Until required by the computer system, the program instructions may be stored in another readable medium, e.g. in disk drive 20, or in a removable memory, such as an optical disk for use in a CD-ROM computer input or in a floppy disk for use in a floppy disk drive computer input. Further, the program instructions may be stored in the memory of another computer prior to use in the system of the present invention and transmitted over a LAN or a WAN, such as the Internet, when required by the user of the present invention. One skilled in the art should appreciate that the processes controlling the present invention are capable of being distributed in the form of computer readable media of a variety of forms.

Although certain preferred embodiments have been shown and described, it will be understood that many changes and modifications may be made therein without departing from the scope and intent of the appended claims.

What is claimed is:

1. In a computer controlled user-interactive display system, a display interface implementation for building software program statements comprising:
    a plurality of display rows;
    means enabling the entry of program terms into each of said rows;
    a template, vertically movable to each of said rows, including a template row of indicators, each defining a program term type enabled to be positioned in said row coincident with said indicator; and
    a plurality of user-activatable menus of selectable terms, each menu respectively associated with one of said indicators and said selectable terms being of the term type enabled to be positioned coincident with said indicator.

2. The display interface implementation of claim 1 further including user-interactive means for selecting one of said indicators to thereby display the menu associated with the selected indicator.

3. The display interface implementation of claim 2 wherein said displayed menu is a scrolled menu from said selected indicator.

4. The display interface implementation of claim 1 said program statements being built are sequential and wrap from at least one of said rows to a next row.

5. In a computer controlled user-interactive display system, a display interface implementation for building search queries to a database comprising:
    a plurality of display rows;
    means enabling the entry of search terms into each of said rows;
    a template, vertically movable to each of said rows, including a template row of indicators, each defining a search term type enabled to be positioned in said row coincident with said indicator; and
    a plurality of user-activatable menus of selectable search terms, each menu respectively associated with one of said indicators and said selectable search terms being of the search term type enabled to be positioned coincident with said indicator.

6. The display interface implementation of claim 5 further including user-interactive means for selecting one of said indicators to thereby display the menu associated with the selected indicator.

7. The display interface implementation of claim 6 wherein said displayed menu is a scrolled menu from said selected indicator.

8. The display interface implementation of claim 5 wherein said search queries being built are sequential and wrap from at least one of said rows to a next row.

9. The display interface implementation of claim 7 wherein one of said search term types is a term defining a property.

10. The display interface implementation of claim 9 wherein one of said search term types is a term defining a value of a selected property.

11. The display interface implementation of claim 10 wherein one of said search term types is a term defining an operator applied to said selected property or selected value.

12. A method for building software program statements on a computer controlled user-interactive display interface comprising:
    displaying a plurality of rows;
    enabling the entry of program terms into each of said rows;
    displaying a template, vertically movable to each of said rows, including a template row of indicators, each defining a program term type enabled to be positioned in said row coincident with said indicator; and
    providing a plurality of selectively displayable menus of selectable terms, each menu respectively associated with one of said indicators and said selectable terms being of the term type enabled to be positioned coincident with said indicator.

13. The method for building software statements of claim 12 further including the step of selecting one of said indicators to thereby display the displayable menu associated with the selected indicator.

14. The method for building software statements of claim 13 wherein said displayed menu is a scrolled menu from said selected indicator.

15. The method for building software statements of claim 12 wherein said program statements being built are sequential and wrap from at least one of said rows to the next row.

16. A method for building search queries to a database on a computer controlled user-interactive display interface comprising:
    displaying a plurality of rows;
    enabling the entry of search terms into each of said rows;
    displaying a template, vertically movable to each of said rows, including a template row of indicators, each defining a search term type enabled to be positioned in said row coincident with said indicator; and
    providing a plurality of selectively displayable menus of selectable search terms, each menu respectively associated with one of said indicators and said selectable search terms being of the search term type enabled to be positioned coincident with said indicator.

17. The method for building search queries of claim 16 further including the step of selecting one of said indicators to thereby display the displayable menu associated with the selected indicator.

18. The method of building search queries of claim 17 wherein said displayed menu is a scrolled menu from said selected indicator.

19. The method of building search queries of claim 16 wherein said search queries being built are sequential and wrap from at least one of said rows to a next row.

20. The method of building search queries of claim 17 wherein one of said search term types is a term defining a property.

21. The method of building search queries of claim 20 wherein one of said search term types is a term defining a value of a selected property.

22. The method of building search queries of claim 21 wherein one of said search term types is a term defining an operator applied to said selected property or selected value.

23. A computer program having program code included on a computer readable medium for providing a display interface implementation for building software program statements on a computer controlled user-interactive display comprising:

means for displaying a plurality of rows;

means enabling the entry of program terms into each of said rows;

means for displaying a template, vertically movable to each of said rows, including a template row of indicators, each defining a program term type enabled to be positioned in said row coincident with said indicator; and means for selectively displaying each of a plurality of user-activatable menus of selectable terms, each menu respectively associated with one of said indicators and said selectable terms being of the term type enabled to be positioned coincident with said indicator.

24. The computer program of claim 23 further including user-interactive means for selecting one of said indicators to thereby display the menu associated with the selected indicator.

25. The computer program of claim 24 wherein said displayed menu is a scrolled menu from said selected indicator.

26. The computer program of claim 23 wherein said program statements being built are sequential and wrap from at least one of said rows to a next row.

27. A computer program having program code included on a computer readable medium for providing a display interface implementation for building search queries to a database on a computer controlled user-interactive display comprising:

means for displaying a plurality of display rows;

means enabling the entry of search terms into each of said rows;

means for displaying a template, vertically movable to each of said rows, including a template row of indicators, each defining a search term type enabled to be positioned in said row coincident with said indicator; and means for selectively displaying a plurality of user-activatable menus of selectable search terms, each menu respectively associated with one of said indicators and said selectable search terms being of the search term type enabled to be positioned coincident with said indicator.

28. The computer program of claim 27 further including user-interactive means for selecting one of said indicators to thereby display the menu associated with the selected indicator.

29. The computer program of claim 28 wherein said displayed menu is a scrolled menu from said selected indicator.

30. The computer program of claim 27 wherein said search queries being built are sequential and wrap from at least one of said rows to a row.

31. The computer program of claim 29 wherein one of said search term types is a term defining a property.

32. The computer program of claim 31 wherein one of said search term types is a term defining a value of a selected property.

33. The computer program of claim 32 wherein one of said search term types is a term defining an operator applied to said selected property or selected value.

* * * * *